Patented Feb. 26, 1952

2,587,093

UNITED STATES PATENT OFFICE 2,587,093

PROCESS FOR THE MANUFACTURE OF POLYCYCLIC QUINONES WHICH CARRY A NITRO AND A HYDROXY GROUP AS NUCLEAR SUBSTITUENTS

Philip Leigh Belshaw, Harold Thompson Howard, and Francis Irving, Blackley, Manchester, England, assignors to Imperial Chemical Industries Limited, a corporation of Great Britain No Drawing. Application April 3, 1950, Serial No. 153,754. In Great Britain April 13, 1949

5 Claims. (Cl. 260—380)

The present invention relates to the manufacture of substituted polycyclic quinones and more particularly to a process for the manufacture of nitrohydroxy-polycyclic quinones.

No satisfactory general process for the manufacture of nitrohydroxy-polycyclic quinones, for example nitrohydroxyanthraquinones, has hitherto been available. As a consequence of this many nitrohydroxy-polycyclic quinones (including some of the simpler ones) have not hitherto been described, and many of those that are known, have not hitherto been readily available commercially. The nitrohydroxy-polycyclic quinones if readily available, would be attractive starting materials for the commercial synthesis of many dyestuffs, pharmaceuticals and other organic compounds, for example 2-nitro-3-hydroxyanthraquinone would be an attractive starting material for the well known dyestuff intermediate 2-amino-3-hydroxyanthraquinone.

The object of the present invention is to provide an improved process for the manufacture of nitrohydroxy-polycyclic quinones.

We have found that nitrohydroxy-polycyclic quinones can be made by a novel reaction namely by the reaction in an organic solvent of a metal nitrite on a polycyclic quinone containing at least two halogeno or nitro substituents.

According to our invention therefore we provide a process for the manufacture of polycyclic quinones carrying a nitro and a hydroxy group as nuclear substituents which comprises treating polycyclic quinones carrying at least two nuclear substituents selected from the class consisting of nitro and halogeno, with a metal nitrite in an organic solvent.

As suitable metal nitrites there may be mentioned for example, the alkali-metal nitrites, for example sodium and potassium nitrites. As suitable polycyclic quinones for use as starting materials there may be mentioned for example, derivatives of anthraquinone, and pyranthrone.

Specific examples are 2:3-dibromo- and 2:3-dichloro-anthraquinone and 2-chloro-3-nitroanthraquinone (which by the process of our invention yield 2-nitro-3-hydroxyanthraquinone), 1-chloro-5-nitro-anthraquinone 1:5-dinitroanthraquinone and 1:5 - dichloroanthraquinone (which yield 5-nitro-1-hydroxyanthraquinone), 1-chloro-8-nitroanthraquinone and 1:8-dichloroanthraquinone (which yield 1-nitro-8-hydroxyanthraquinone), 1-chloro-4-nitroanthraquinone, 1-bromo - 4 - nitroanthraquinone, and 1:4-dichloroanthraquinone (which yield 1-nitro-4-hydroxyanthraquinone), 2:6-dichloroanthraquinone (which yields 2-nitro-6-hydroxyanthraquinone), 4:10 - dibromoanthanthrone (which yields 10-nitro-4-hydroxyanthanthrone), 1:5-dichloro - 4:8 - dinitro-anthraquinone, 1:4:5:8-tetrachloroanthraquinone, and 1:8-dichloro-4:5-dinitro-anthraquinone (which yield 4:5:8-trinitro-1-hydroxyanthraquinone), 1:2 - dichloroanthraquinone and 1-chloro - 2 - nitroanthraquinone (each of which yields a mixture of 1-nitro-2-hydroxy- and 2-nitro-1-hydroxyanthraquinones), 1:8-dichloro - 4 - nitroanthraquinone and 1:5 - dichloro-4-nitroanthraquinone (each of which yields a mixture of 5-chloro-4-nitro-1-hydroxyanthraquinone and 5-chloro-1-nitro-4-hydroxyanthraquinone) 1:3 - dichloroanthraquinone (which gives a mixture of 1-nitro-3-hydroxy- and 1-hydroxy-3-nitroanthraquinones), 1-chloro - 4:8 - dinitroanthraquinone and 1:4:5-trichloroanthraquinone (each of which gives a mixture of dinitrohydroxyanthraquinones), dibromopyranthrone (which gives nitrohydroxypyranthrone) 1:5-dinitro-2-methylanthraquinone (which gives a mixture of nitrohydroxy-methyl-anthraquinones) mixed dinitroanthraquinones (which give a mixture of nitrohydroxyanthraquinones) and 1-chloro-2:5-dinitroanthraquinone.

In view of the wide range of starting materials which can be used, it will be apparent that the optimum condition required for reaction with different starting materials will vary considerably. With some starting materials a slow reaction is detectable at temperatures as low as 20° C. and the reaction proceeds rapidly at about 80° C., whereas with other starting materials a temperature of about 150° C. or higher is required to obtain a useful reaction rate.

Also with some starting materials hydroxylic solvents, for example β-ethoxyethanol can be used, whereas with less reactive starting materials such solvents are not suitable. Among the solvents which we have found to be generally useful, there should be mentioned the organic amides derived from secondary amines of the type used in British Specification No. 610.117, for example dimethylformamide and N-isopropylphthalimidine. If required mixtures of solvents can be used.

The process of our invention is especially valuable for the production of 2-nitro-3-hydroxyanthraquinone from 2:3-disubstituted anthraquinones. This reaction may be carried out between 100° C. and 200° C. according to the solvent used, but is conveniently carried out at 100°–150° C.

and preferably at about 140° C. As solvent there may be used dimethylformamide.

In addition to 2-nitro-3-hydroxyanthraquinone, other new substances can be obtained by the process of our invention. There may be obtained for example, 1-nitro-5-hydroxy-anthraquinone, 1 - nitro - 8 - hydroxy - anthraquinone, 4:5:8-trinitro-1-hydroxy - anthraquinone, 2 - nitro-1-hydroxy - anthraquinone, nitro - hydroxyanthanthrone, nitro-hydroxypyranthrone, 2-nitro-6-hydroxy-anthraquinone, 5-chloro-4-nitro-1-hydroxy-anthraquinone, 5-chloro - 1 - nitro-4-hydroxy-anthraquinone, 1:4:5 - dinitrohydroxyanthraquinones, nitrohydroxymethylanthraquinones.

From the starting materials containing halogen given above and the products obtained from them, it will be seen that the reaction cannot be regarded as a simple replacement of halogen by hydroxyl (1-chloro-2-nitroanthraquinone for example gives a mixture of 1-nitro-2-hydroxy- and 2-nitro-1-hydroxyanthraquinones and 1:8-dichloro-4-nitro-anthraquinone, gives a mixture of 5-chloro-4-nitro-1-hydroxyanthraquinone and 5-chloro-1-nitro - 4 - hydroxyanthraquinone). A single reaction product is however obtained from a symmetrically substituted polycyclic quinone, that is to say one containing one nitro and one halogeno group or an even number of halogens and/or nitro groups in equivalent positions in the nucleus.

When a mixture of reaction products is obtained, they may be separated by conventional methods of separation or the mixture may if desired be used in further synthesis without such separation.

The invention is illustrated but not limited by the following examples in which the parts are by weight:

*Example 1*

A mixture of 10 parts of 1:5-dichloro-anthraquinone and 100 parts of dimethylformamide is stirred at 140° C. and 10 parts of sodium nitrite are added during 1 hour. The mixture is stirred at 140° C. for a further 7–8 hours after which time nitrous fumes are no longer evolved. The mixture is cooled and poured into 500 parts of hot water and the suspension so obtained is stirred, and acidified with hydrochloric acid. The resulting suspension is stirred at 85°–90° C. and the yellow precipitate is then filtered off, washed acid-free with water and dried. The 5-nitro-1-hydroxyanthraquinone thus obtained is crystallised from dimethylformamide. The product melts at 200° C. It dissolves in concentrated sulphuric acid to give a cherry-red solution. 5-nitro-1-hydroxyanthraquinone can also be obtained by treating 1-chloro-5-nitro-anthraquinone with sodium nitrite in the manner described above.

*Example 2*

A mixture of 20 parts of 1:5-dichloro-4:8-dinitroanthraquinone and 100 parts of dimethylformamide is stirred at 50° C. and 22.5 parts of sodium nitrite are slowly added. When the first rapid reaction has subsided, the mixture is heated to 80° C. and stirred at that temperature until no more nitrous fumes are being evolved. This takes about 5 hours. The mixture is then poured into 500 parts of water, and the suspension is acidified with hydrochloric acid and heated to 60° C. The suspension is stirred at 60° C. for ½ hour and it is then filtered. The orange-yellow precipitate is filtered off, washed with 1% hydrochloric acid and dried. The 4:5:8-trinitro-1-hydroxyanthraquinone thus obtained crystallises from monochlorobenzene and melts at 245° C. It dissolves with difficulty in concentrated sulphuric acid to give an orange solution. 4:5:8-trinitro-1-hydroxyanthraquinone is also obtained when 1:8-dichloro-4:5-dinitroanthraquinone is treated in the manner described above.

In the above reactions aqueous Cellosolve may be used as solvent in place of dimethylformamide.

If 20 parts of 1:4:5:8-tetrachloroanthraquinone are reacted with 40 parts of sodium nitrite in dimethylformamide in the manner described above until no further evolution of nitrous gases occurs, then 4:5:8-trinitro-1-hydroxyanthraquinone is obtained which is identical with the material derived from 1:5-dichloro-4:8-dinitroanthraquinone.

*Example 3*

A solution of 10 parts of 1:4-dichloroanthraquinone in 100 parts of dimethylformamide is stirred at 130–140° C. while 10 parts of sodium nitrite are added over 30 minutes. The mixture is then stirred at 140° C. until no more nitrous fumes are evolved. The mixture is allowed to cool to 80° C. and it is then poured into 500 parts of hot water. The red solution so obtained is acidified and the yellow precipitate is washed acid-free and dried. The 1-nitro-4-hydroxyanthraquinone so obtained gives an orange colour in strong sulphuric acid and a red solution in alkali.

If 1-chloro-4-nitroanthraquinone is substituted for 1:4-dichloroanthraquinone a product identical with that described above is obtained. In a similar manner 1-bromo-4-nitroanthraquinone may be used. With these 2 starting materials aqueous Cellosolve may be used for the reaction in place of dimethylformamide. (The 1-bromo-4-nitroanthraquinone may be prepared by the nitration of 28 parts of 1-bromoanthraquinone in 250 parts of 98% sulphuric acid with 8 parts of 67% nitric acid at 10° C. The product is isolated by diluting the reaction mixture in water and filtering off the precipitate. When crystallised from dimethylformamide it melts at 258° C.)

*Example 4*

120 parts of sodium nitrite are added over a period of 2 hours to a solution of 95 parts of 2:3-dichloroanthraquinone in 400 parts of dimethylformamide which is being stirred at 140° C. The reaction is allowed to continue at 140° C. until no more nitrous fumes are evolved. The solution is allowed to cool to 50° C. and it is then diluted with 400 parts of ethylene dichloride. The mixture is filtered at 25° C. and the residue on the filter is washed twice with 200 parts of ethylene dichloride. The residue is freed from ethylene dichloride and added to 4000 parts of water at 90° C. The mixture is acidified with hydrochloric acid and the pale yellow precipitate is filtered off, washed acid-free and dried at 100° C. The 2-nitro-3-hydroxyanthraquinone so obtained melts at 232–4° C.

In place of the 2:3-dichloroanthraquinone an equivalent quantity of 2:3-dibromoanthraquinone may be used when 2-nitro-3-hydroxyanthraquinone is again obtained. Alternatively, 2-chloro-3-nitroanthraquinone may be employed.

When 2:3-dichloro- or 2:3-dibromoanthraquinone is used as starting material, tetramethylene sulphone or dimethyl-tetramethylene sulphone may be used as solvent in place of dimethylformamide. Aqueous Cellosolve may replace dimethylformamide as solvent when 2-chloro-3-nitroanthraquinone is used as the starting material.

Example 5

10 parts of 1:8-dichloroanthraquinone in 100 parts of dimethylformamide are reacted with sodium nitrite according to the method given in Example I. The 1-nitro-8-hydroxyanthraquinone so obtained when crystallised from monochlorobenzene or dimethylformamide melts at 221–3° C. An equivalent quantity of 1-chloro-8-nitroanthraquinone may be used in place of 1:8-dichloroanthraquinone when 1-nitro-8-hydroxyanthraquinone is obtained identical with that from 1:8-dichloroanthraquinone.

Example 6

10 parts of a mixture of dinitroanthraquinones (obtained by the dinitration of anthraquinone in strong sulphuric acid) are stirred at 140° C. in 100 parts of dimethylformamide while 10 parts of sodium nitrite are added during 30 minutes. The reaction is allowed to continue until no more nitrous fumes are evolved and the mixture is then cooled and added to 500 parts of water. The mixture is acidified with hydrochloric acid and the orange yellow precipitate, (a mixture of nitrohydroxyanthraquinones), is filtered off, washed acid-free and dried. The product dissolved in caustic alkali solution to give a red solution.

In place of dimethylformamide, aqueous Cellosolve (containing 10% water) may be used as solvent.

Example 7

3.3 parts of 1:5-dinitroanthraquinone in 30 parts of dimethylformamide are reacted with 3 parts of sodium nitrite under the conditions used in Example 3. The reaction mixture is then cooled and poured into 500 parts of hot water. The mixture is filtered and the residue is stirred with 400 parts of boiling water and filtered. The filtrates are combined and acidified and the yellow precipitate so obtained is collected, washed acid-free and dried. When recrystallised from dimethylformamide, the product melts at 201–2° C. It is identical with the 1-nitro-5-hydroxyanthraquinone, obtained in Example 1.

Example 8

10 parts of 1:8-dichloro-4-nitroanthraquinone in 205 parts of Cellosolve are heated at 110° C. while a solution of 9.25 parts of sodium nitrite in 14 parts of water is added over ½ hour. The temperature is maintained at 110–112° C. for several hours and the mixture is then diluted with 1000 parts of water. The mixture is filtered at 100° C. and the residue on the filter is extracted with a further 1000 parts of boiling water. The combined filtrates are acidified, and the yellow precipitate is filtered off, washed acid-free and dried. When crystallised from o-dichlorobenzene, the 5-chloro-4-nitro-1-hydroxyanthraquinone so obtained melts at 254–6° C.

The residue from the extractions with boiling water is stirred with dilute sodium carbonate solution and the mixture is filtered. The filtrate is acidified and the precipitate is filtered off and crystallised from o-dichlorobenzene when 5-chloro-1-nitro-4-hydroxyanthraquinone (melting point 298° C.) is obtained.

When 1:5-dichloro-4-nitroanthraquinone is used in place of 1:8-dichloro-4-nitroanthraquinone in this example the same two products are obtained.

Example 9

A solution of 39 parts of 1:2-dichloroanthraquinone in 200 parts of dimethylformamide is stirred at 130° C. while 39 parts of sodium nitrite are added over a period of 1 hour. The mixture is stirred at 130–140° C. for 8 hours, and then cooled and the precipitated salts are filtered off. The residue on the filter is washed with 100 parts of ethylene dichloride, dried, suspended in 1000 parts of water at 90° C. and acidified.

The yellow precipitate is filtered off, washed acid-free and dried at 60° C. The product when crystallised from monochlorobenzene melts at 193° C. and is probably 2-nitro-1-hydroxyanthraquinone. The dimethylformamide mother liquors from the reaction are poured into water, and the mixture is acidified, when a mixture of nitro-hydroxyanthraquinones is obtained. An equivalent quantity of 1-chloro-2-nitroanthraquinone may be used in place of the 1:2-dichloroanthraquinone when the above products are obtained.

Example 10

A solution of 10 parts of 1:3-dichloroanthraquinone in 100 parts of dimethylformamide is stirred at 140° C. while 10 parts of sodium nitrite are slowly added. The mixture is treated, and the product is isolated as described in Example 3.

A mixture of isomeric nitrohydroxyanthraquinones is obtained. To separate the isomers 3 parts of the mixture is stirred at 45–50° C. in 50 parts of water containing 1.5 parts of sodium carbonate while 3 parts of dimethylsulphate are slowly added. After being stirred for 2 hours, the mixture is poured into 500 parts of water at 95° C., and the solid is filtered off. The yellow residue on the filter is dried and crystallised from monochlorobenzene. It is insoluble in alkali, it melts at 240° C. and it is probably 1-nitro-3-methoxyanthraquinone. The filtrate from the methylation is acidified and the precipitate so formed is filtered off, washed acid-free dried and crystallised from monochlorobenzene. The product melts are 238–240° C., it gives a violet-red colour in alkali and it is probably 3-nitro-1-hydroxyanthraquinone.

Example 11

30 parts of dibromoanthanthrone are stirred in 200 parts of dimethylformamide at 140° C. while 30 parts of sodium nitrite are added. The mixture is stirred until no more nitrous fumes are evolved. The green solution is then poured into 1000 parts of water and the mixture is acidified. The black-violet precipitate is filtered off, washed acid-free and dried at 100° C. The nitrohydroxyanthanthrone so obtained gives a green colour in caustic alkali and a green solution in strong sulphuric acid. It dyes cotton from a violet-red vat in greenish grey shades which become bluish grey when treated with dilute acetic acid.

Example 12

10 parts of 1-chloro-4:8-dinitroanthraquinone are stirred at 100° C. with 100 parts of dimethylformamide and 10 parts of sodium nitrite for 8 hours. The mixture is cooled and poured into 500 parts of hot water and the mixture is acidified. The yellow precipitate so formed is filtered off, washed acid-free and boiled with 1% sodium carbonate solution. The suspension is filtered hot and the filtrate is acidified. The yellow precipitate so formed is filtered off, washed acid-free and dried. A mixture of dinitrohydroxyanthraquinones is produced. In place of dimethylformamide, aqueous Cellosolve may be used as solvent for the reaction.

The same reaction products are obtained if an equivalent quantity of 1:4:5-trichloroanthraquinone is reacted with sodium nitrite in dimethylformamide, at 140° C., until no more nitrous fumes are evolved.

*Example 13*

10 parts of finely powdered dibromopyranthrone are stirred in 100 parts of dimethylformamide at 145° C. while 10 parts of sodium nitrite are added during 1 hour. The reaction mixture is stirred at this temperature until no more nitrous fumes are evolved. The reaction mixture is then cooled, and poured into 750 parts of water. The mixture is acidified and the nitrohydroxypyranthrone is filtered off. The product gives a blue colour in strong sulphuric acid and a violet coloured vat. The sodium salt of the product gives a green colour in dimethyl formamide.

*Example 14*

A mixture of 100 parts of dimethylformamide, 10 parts of sodium nitrite and 10 parts of 2:6-dichloroanthraquinone is stirred at 140°–145° C. until no more nitrous fumes are evolved. The product is isolated by the method described in Example 3. The 2-nitro-6-hydroxyanthraquinone so obtained gives an orange colour in alkaline solution, and an orange solution in strong sulphuric acid.

*Example 15*

5 parts of 1:5-dinitro-2-methylanthraquinone and 5 parts of sodium nitrite are stirred at 145° C. in 50 parts of dimethylformamide for 4 hours. The mixture is cooled to 90° C. and poured into 500 parts of water at 90° C. The mixture is filtered and the residue is stirred with 500 parts of water at 90° C. and again filtered off. The combined filtrates are acidified, and the mixture of nitrohydroxymethylanthraquinones so precipitated is filtered off, washed acid-free and dried at 100° C. The product is soluble in caustic soda solution giving a bluish-red solution.

What we claim is:

1. Process for the manufacture of polycyclic quinones carrying a nitro and a hydroxy group as nuclear substituents which comprises treating polycyclic quinones selected from the group consisting of anthraquinones, anthanthrones and pyranthrones carrying at least two nuclear substituents selected from the class consisting of nitro and halogeno, with a metal nitrite in an organic solvent and in the absence of a free acid.

2. Process for the manufacture of anthraquinone intermediates carrying a nitro and a hydroxy group as nuclear substituents which comprises treating anthraquinone intermediates carrying at least two nuclear substituents selected from the class consisting of nitro and halogeno, with a metal nitrite in an organic solvent and in the absence of a free acid.

3. Process for the manufacture of 2-nitro-3-hydroxyanthraquinone which comprises treating an anthraquinone substituted in the 2 and 3 positions by substituents selected from the group consisting of halogeno and nitro, with a metal nitrite in an organic solvent and in the absence of a free acid.

4. The process of claim 1, wherein said solvent is an organic amide derived from a secondary amine.

5. The process of claim 4, wherein said organic amide is dimethylformamide.

PHILIP LEIGH BELSHAW.
HAROLD THOMPSON HOWARD.
FRANCIS IRVING.

REFERENCES CITED

The following references are of record in the file of this patent:

FOREIGN PATENTS

| Number | Country | Date |
|--------|---------|------|
| 13,029 | Great Britain | 1893 |
| 90,041 | Germany | July 1908 |